(12) United States Patent
Duan et al.

(10) Patent No.: US 8,245,354 B2
(45) Date of Patent: Aug. 21, 2012

(54) HINGE ASSEMBLY FOR FOLDABLE ELECTRONIC DEVICE

(75) Inventors: Chao Duan, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 446 days.

(21) Appl. No.: 12/610,520

(22) Filed: Nov. 2, 2009

(65) Prior Publication Data

US 2011/0067203 A1    Mar. 24, 2011

(30) Foreign Application Priority Data

Sep. 24, 2009  (CN) .......................... 2009 1 0307640

(51) Int. Cl.
*E05F 1/08* (2006.01)
(52) U.S. Cl. ................. 16/303; 16/277; 16/308
(58) Field of Classification Search ............... 16/277, 16/283–285, 303, 308; 361/679.3
See application file for complete search history.

(56) References Cited

U.S. PATENT DOCUMENTS

| 6,115,886 | A  | * | 9/2000  | Fujita .............................. | 16/330 |
| 7,100,244 | B2 | * | 9/2006  | Qin et al. ......................... | 16/330 |
| 7,434,296 | B2 | * | 10/2008 | Kubota ............................ | 16/330 |
| 7,480,961 | B2 | * | 1/2009  | Yang .............................. | 16/303 |
| 7,631,398 | B1 | * | 12/2009 | Lin ................................ | 16/341 |
| 7,694,390 | B2 | * | 4/2010  | Luo ................................ | 16/303 |
| 7,707,688 | B2 | * | 5/2010  | Ishikawa et al. ................ | 16/303 |
| 2004/0216275 | A1 | * | 11/2004 | Hayashi ......................... | 16/303 |
| 2006/0070211 | A1 | * | 4/2006  | Luo ................................ | 16/303 |
| 2006/0101618 | A1 | * | 5/2006  | Minami et al. .................. | 16/303 |

* cited by examiner

*Primary Examiner* — Victor Batson
*Assistant Examiner* — Roberta Delisle
(74) *Attorney, Agent, or Firm* — Altis Law Group, Inc.

(57) ABSTRACT

A hinge assembly includes a shaft, a cam, a follower, and an resilient member. The follower is mounted on the shaft. One end of the follower has a first cam surface. The first cam surface defines a groove. The cam is mounted on the shaft and adjacent to the follower. The cam has a second cam surface, and the second cam surface engages with the first cam surface. The second cam surface forms a protrusion, and the protrusion is received in the groove. The resilient member is placed around the shaft forcing the first cam surface to engage with the second cam surface.

13 Claims, 5 Drawing Sheets

HINGE ASSEMBLY FOR FOLDABLE ELECTRONIC DEVICE

BACKGROUND

1. Technical Field

The present disclosure generally relates to hinge assemblies and, more particularly, to a hinge assembly for hinging together housings of foldable electronic devices such as mobile telephones, electronic notebooks, and so on.

2. Description of Related Art

With the development of the technologies of wireless communication and information processing, portable electronic devices such as mobile phones and notebooks are now widely used. Foldable electronic devices are particularly favored by consumers for their convenience. Generally, foldable electronic devices have a main body and a cover. Various types of hinge assemblies are used to join the main body and the cover of the foldable electronic device, so that the cover can unfold from and fold on the main body.

A conventional hinge assembly includes a shaft, a cam, a follower engaging with the cam, and a spring. The cam, the follower, and the spring are mounted on the shaft. However, most conventional hinge assemblies only allow the cover to be opened less than 180 degrees relative to the main body.

Therefore, there is room for improvement within the art.

BRIEF DESCRIPTION OF THE DRAWINGS

Many aspects of the present hinge assembly for foldable electronic device can be better understood with reference to the following drawings. The components in the drawings are not necessarily drawn to scale, the emphasis instead being placed upon clearly illustrating the principles of the present hinge assembly for foldable electronic device. Moreover, in the drawings, like reference numerals designate corresponding parts throughout the several views.

DETAILED DESCRIPTION

Figure 1:
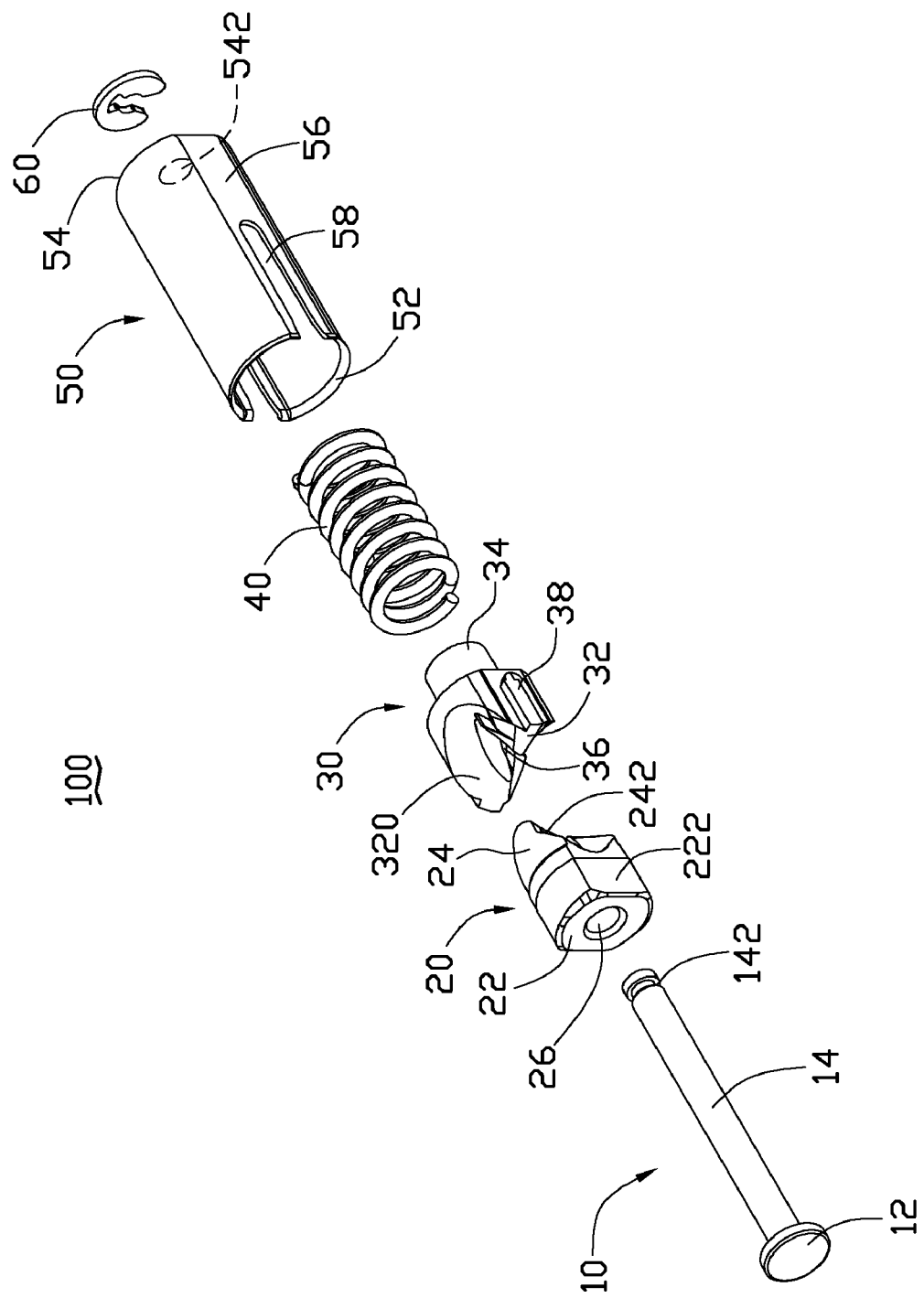
FIG. 1 is an explored, isometric view of a hinge assembly, according to an exemplary embodiment.

FIG. 1 shows a hinge assembly 100 according to an exemplary embodiment of the present hinge system. The hinge assembly 100 includes a main shaft 10, a follower 20, a cam 30, a resilient member 40, a sleeve 50, and a washer 60.

The main shaft 10 coaxially includes a head portion 12 and a shaft portion 14. The shaft portion 14 extends from one end of the head portion 12 and has a smaller diameter than the diameter of the head portion 12. A free end of the shaft portion 14 defines a ring groove 142.

Figure 2:
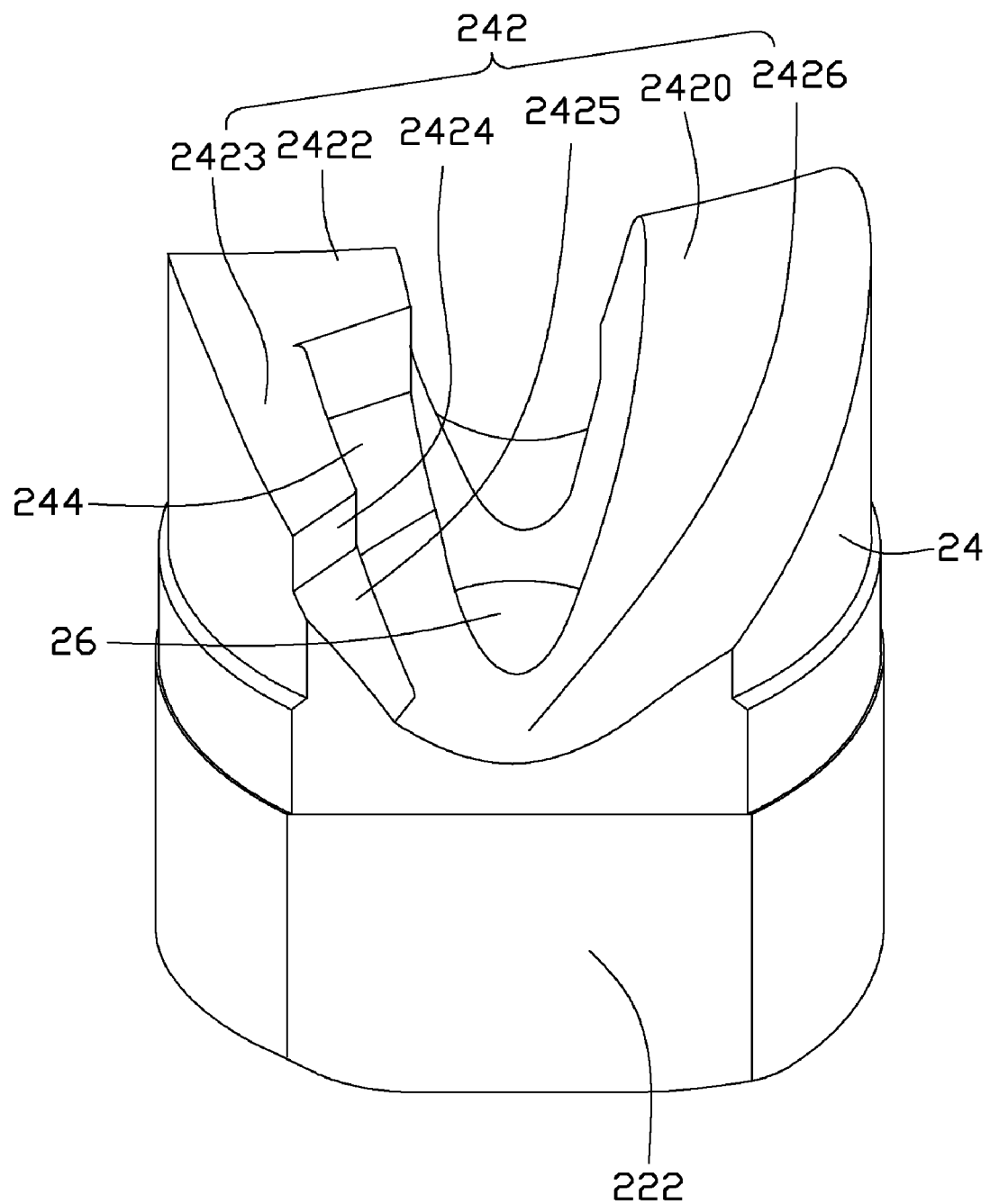
FIG. 2 is an enlarged, isometric view of the follower of the hinge assembly shown in FIG. 1.

Referring to FIG. 2, the follower 20 includes a fixing portion 22 and a cam portion 24 formed in any manner not allowing them to rotate relative to one another. For example, they can be integrally formed together. The fixing portion 22 forms at least one, but preferably two symmetric planar surfaces 222. The follower 20 defines a hole 26. The shaft portion 14 may be received in the hole 26, and the head portion 12 may abut the fixing portion 22. The cam portion 24 includes at least one, but preferably two symmetric first cam surfaces 242. Each first cam surface 242 includes a plurality of sub-surfaces. For example, first cam surface 242 may include a beginning surface 2420, a peak 2422, a guiding surface 2423, a stopper surface 2424, an end surface 2425, and a valley 2426. The beginning surface 2420 has a mild slope (e.g. less than 45°), and the height of the beginning surface 2420 gradually increases with the increase in distance from the valley 2426. The peak 2422 is formed at a distal end of the beginning surface 2420, and is at a highest position of the beginning surface 2420. The guiding surface 2423 is a sharper slope (e.g. greater than 45°), and the height of the guiding surface 2420 decreases with the increase in distance from the peak 2422. The stopper surface 2424 is substantially a vertical surface, and the end surface 2425 connects the stopper surface 2424 to the valley 2426. Each first cam surface 242 also defines a groove 244. The groove 244 is defined in the guiding surface 2423, the stopper surface 2424 and the end surface 2425, and extends to the valley 2426. The groove 244 communicates with an inner portion of the first cam surface 242, and communicates with the hole 26.

Figure 3:
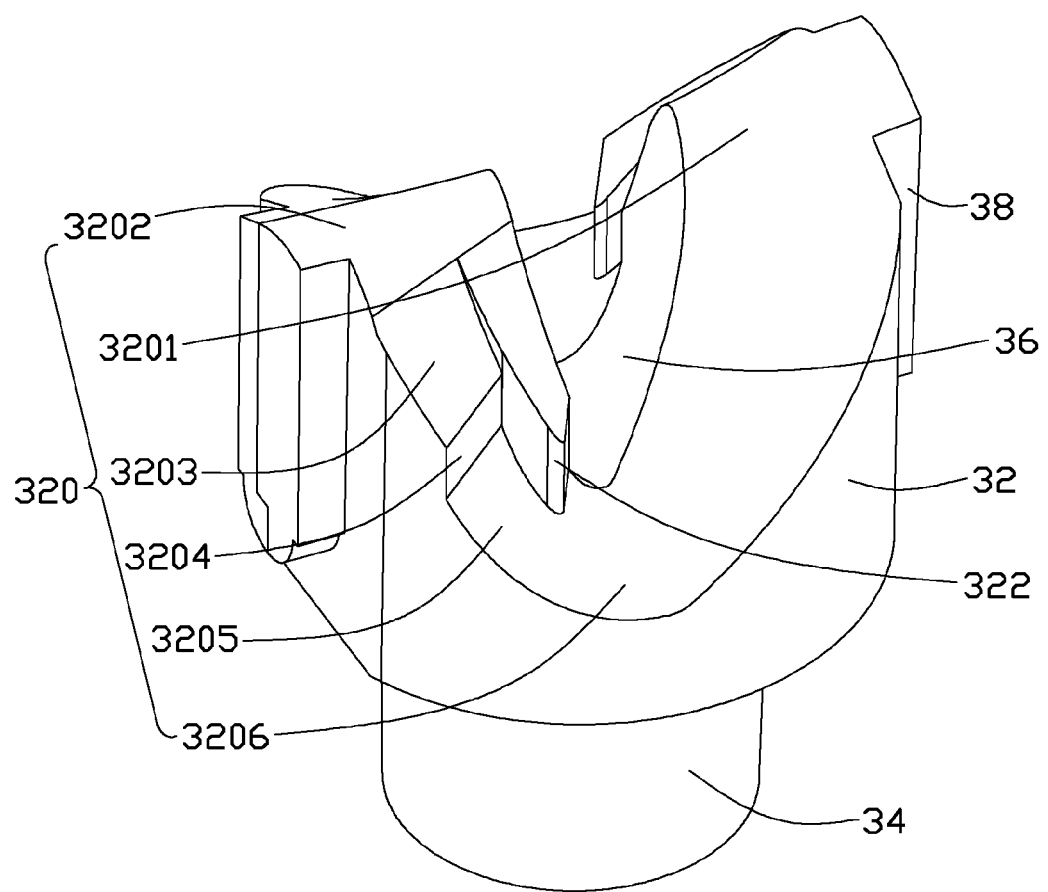
FIG. 3 is an enlarged, isometric view of the cam of the hinge assembly shown in FIG. 1.

Referring to FIG. 3, the cam 30 includes a latching cam portion 32 and an extending portion 34 extending from the latching cam portion 32. A diameter of the extending portion 34 is less than the diameter of the latching cam portion 32. At least one, but preferably two projections 38 are symmetrically formed on an outer periphery of the latching cam portion 32. A longitudinal passage 36 defined in the cam 30 receives the shaft portion 14. The latching cam portion 32 includes second cam surfaces 320 for engaging with the first cam surfaces 242 of the follower 20. There is one second cam surface 320 for each first cam surface 242. Each second cam surface 320 includes a plurality of sub-surfaces. For example, second cam surface 320 can include a beginning surface 3201, a peak 3202, a guiding surface 3203, a stopper surface 3204, an end surface 3205 and a valley 3206 connected each other. The beginning surface 3201 has a mild slope (e.g. less than about 45°), and the height of the beginning surface 3201 gradually increases with the distance from peak 3206. The peak 3202 is formed at a distal end of the beginning surface 3201, and is at a highest position of the beginning surface 3201. The guiding surface 3203 has a sharp slope (e.g. greater than 45°), and the height of the guiding surface 3203 decreases from the peak 3202. The stopper surface 3204 is substantially a vertical surface, and the end surface 3205 connects the stopper surface 3204 with the valley 3206. Each first cam surface 320 also forms a protrusion 322. The protrusion 322 extends from near peak 3202, and is substantially an arcuate wall. The grooves 244 of the follower 20 provide spaces for the protrusions 322 to avoid interferences. In addition, the protrusions 322 are smoothly connected to the guiding surface 3203 of the second cam surface 320 to prevent the protrusions 322 from impacting the follower 20.

The resilient member 40 is preferably made of metal and is spiral-shaped (i.e. a coil spring). An inner diameter of the resilient member 40 is slightly larger than a diameter of the shaft portion 14 so the resilient member 40 can be placed around the main shaft 10.

The sleeve 50 is substantially a hollow cylinder. The sleeve 50 includes an open end 52 and a partially-closed end 54. The partially-closed end 54 has a central hole 542. The sleeve 50 forms at least one flat surface portion 56 along an outer peripheral wall thereof. The number of flat surface portions 46 corresponds to the number of planar surfaces 222. The flat surface portions 56 extend from the partially-closed end 54. A guide slot 58 is defined in each flat surface portion 56. The projections 38 of the cam 30 are slidably engaged in the guide slots 58. Therefore, the number of guide slots 58 should correspond to the number of projections 38.

The washer 60 is made of made of a strong material, such as metal. In the present embodiment, the washer 60 is substantially C-shaped and is clasped in the ring groove 142, thereby mounted with the main shaft 10.

Figure 4:
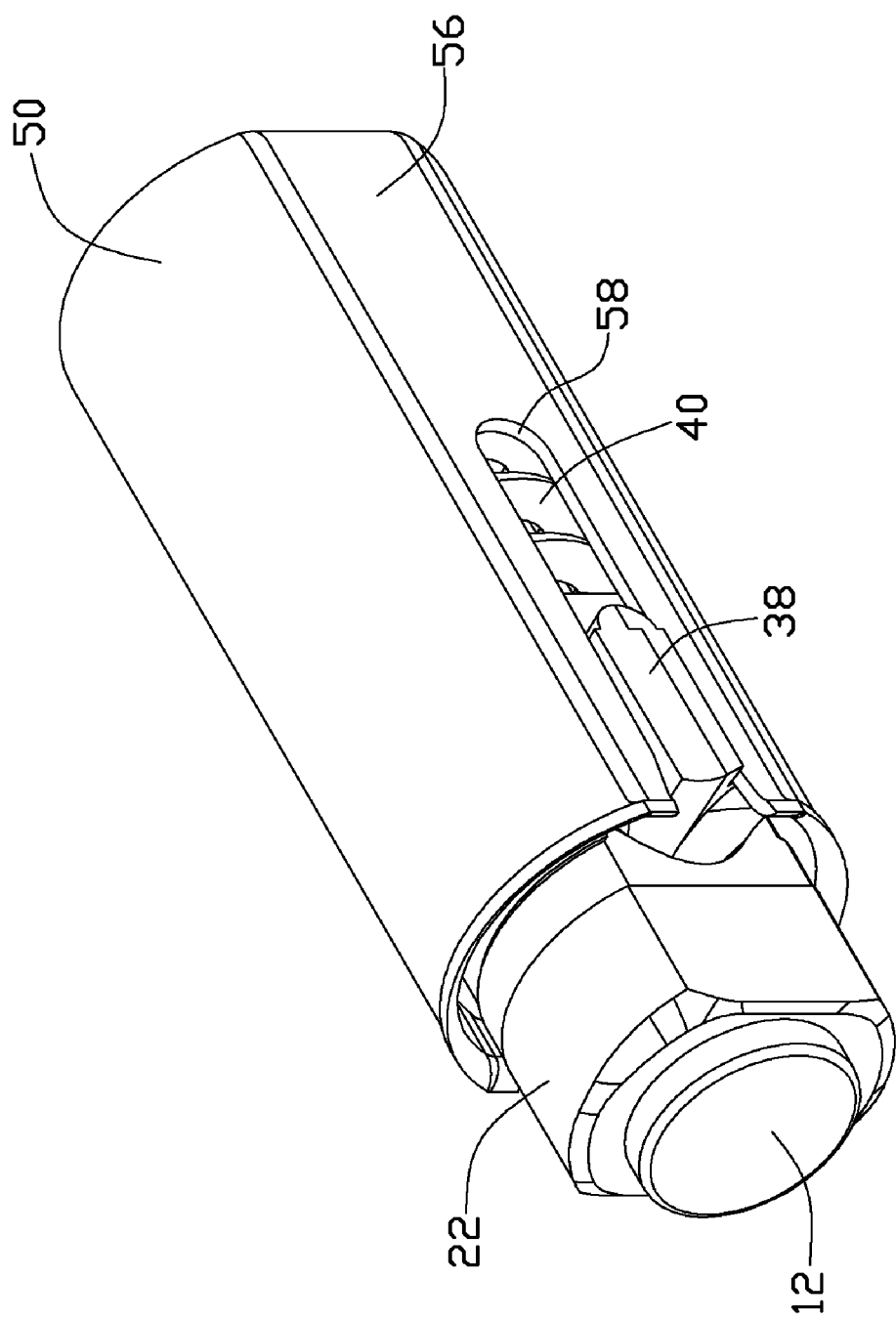
FIG. 4 is an assembled, isometric view of the hinge assembly shown in FIG. 1.

Referring to FIG. 4, in assembly, the follower 20, the cam 30, and the resilient member 40 are mounted on the shaft 10. The second cam surface 320 of the cam 30 engages with the first cam surface 242 of the follower 20. Each projection 38 of the cam 30 is received in a corresponding guiding slot 58. One end of the resilient member 40 placed around the extending portion 34, and the other end of the resilient member 40 abuts against the partially-closed end 54. One free end the main shaft 10 passes through the central hole 542, and the washer 60 is mounted in the ring groove 142. Thus, the hinge assembly 100 is integrated into a complete unit.

Figure 5:
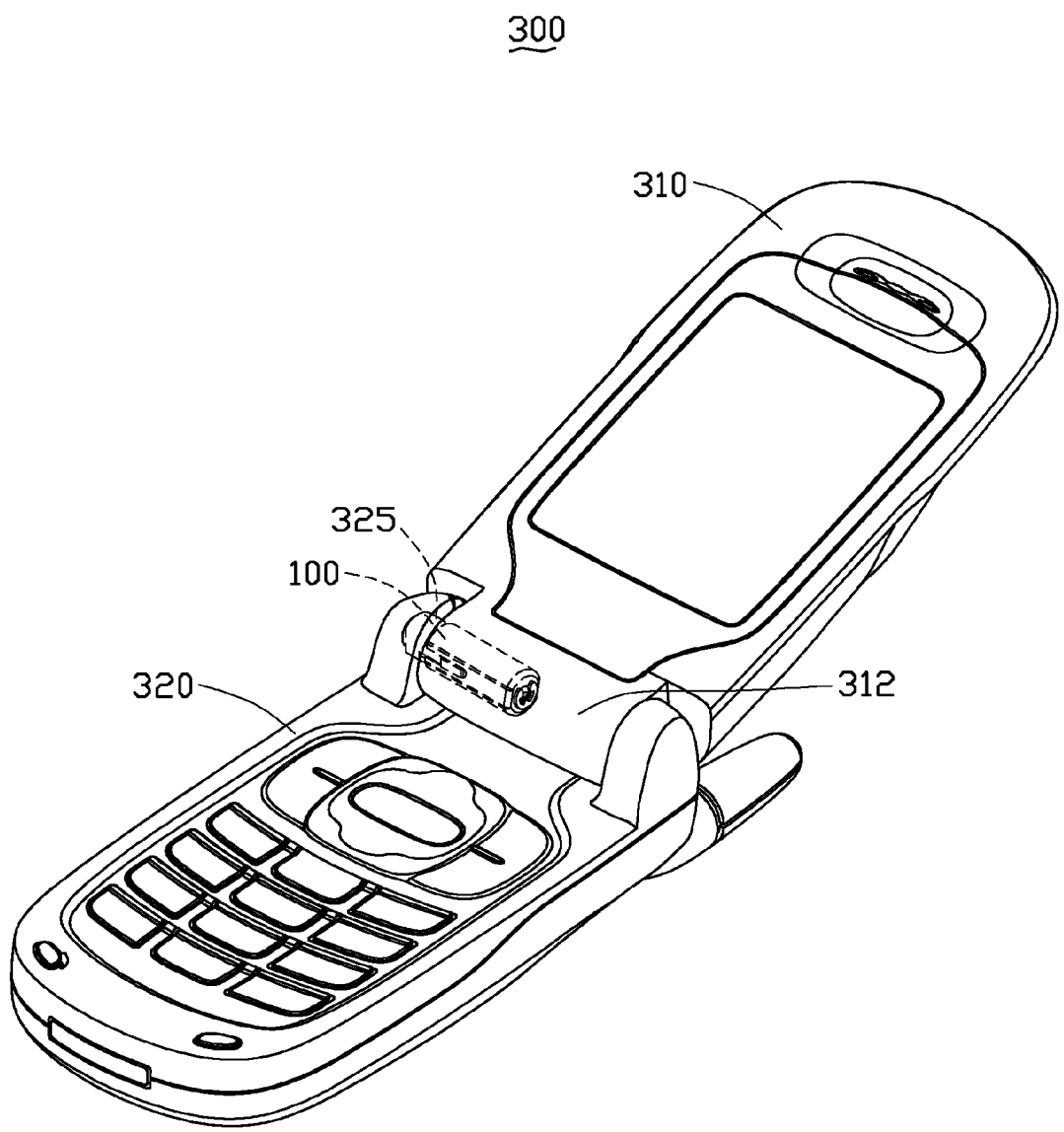
FIG. 5 is an isometric view of a foldable electronic device with the hinge assembly shown in FIG. 1.

Referring to FIG. 5, the hinge assembly 100, in the embodiment illustrated, is used to interconnect a main body 320 and a cover 310 of a foldable electronic device 300. The cover 310 has a hinge barrel 312 formed at one end. The main body 320 defines a mounting hole 325 in one end. When mounting the hinge assemble 100 with the foldable electronic device 300, the hinge assembly 100 is partially received in the hinge barrel 312. The head portion 12 is pushed to move towards washer 60, hence the follower 20 moves and compresses the resilient member 40. When the head portion 12 and the follower 20 are moved further into the sleeve 50 and the hinge barrel 312 and faces the mounting hole 352, the head portion 12 and the follower 20 become released and automatically moves into the mounting hole 325 due to the decompression of the resilient member 40. The planar surfaces 222 of the fixing portion 22 engage the mounting hole 352 of the main body 320, and thus the sleeve 50 non-rotatably engages with the cover 310.

When the cover 310 is closed relative to the main body 320, the peaks 3202 of the second cam surface 320 abut against the beginning surfaces 2420 of the first cam surface 242. The protrusions 322 are received in the grooves 244. The resilient member 40 is compressed to enable the cover 310 and the main body 320 to be in an original closed, stable state.

To open the foldable electronic device 300, the cover 310 is manually rotated away from the main body 320, hence the sleeve 50 and the cam 30 rotate relative to the follower 20. The peaks 3202 of the second cam surface 320 slide along the beginning surfaces 2420, and the resilient member 40 is compressed further. When the cover 310 is opened to a predetermined angle, the peaks 3202 slide over the peaks 2422 of the first cam surfaces 240. At the same time, the resilient member 40 is almost completely compressed. Then, when the cover 310 is released, the follower 20 automatically rotates relative to the cam 30 due to the expansion of the resilient member 40 as the peaks 3202 slide down along the guiding surfaces 2423. When the cover 310 is opened 180 degrees relative to the main body 320, the peaks 3202 will have slid to a position adjacent to the stopper surface 2424, and the protrusions 322 will have rotated beyond 180 degrees relative to the follower 20. Thus, the cover 310 is automatically rotated to a fully and stable open state, beyond 180 degrees relative to the main body 320. The process of closing the cover 310 is reverse to the process of opening the cover 310.

It should be understood that the cam portions of follower 20 and the cam 30 may have other shapes. The shape of the cam portion may be changed according to the open angle of the cover. The washer 60 may be mounted with the shaft 10 by weld. The head portion 12 and may be integrally attached with the main shaft 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for connecting a cover and a main body of a foldable electronic device, comprising:
   a shaft;
   a follower disposed on the shaft, one end of the follower having a first cam surface, the first cam surface defining a groove;
   a cam mounted on the shaft and adjacent to the follower, the cam having a second cam surface, the second cam surface engaging with the first cam surface, the second cam surface forming a protrusion, the protrusion being received in the groove; and
   a resilient member placed around the shaft forcing the first cam surface against the second cam surface;
   wherein when the follower rotates 180 degrees relative to the cam, the protrusion of the cam causes the cam to rotate beyond 180 degrees relative to the follower.

2. The hinge assembly of claim 1, wherein the follower defines a hole, the groove communicates with an inner portion of the first cam surface and the hole.

3. The hinge assembly of claim 1, wherein the first cam surface includes a guiding surface, a stopper surface, an end surface, and a valley, the groove is defined in the guiding surface, the stopper surface and the end surface, and extends to the valley.

4. The hinge assembly of claim 3, wherein the second cam surface includes a stopper surface, the protrusion extends from the stopper surface.

5. The hinge assembly of claim 1, wherein the protrusion is substantially an arcuate wall.

6. A foldable electronic device, comprising:
   a main body;
   a cover rotatably mounted with the main body; and
   a hinge assembly connecting the cover to the main body, the hinge assembly comprising:
   a shaft;
   a follower mounted on the shaft, one end of the follower having a first cam surface defining a groove, the first cam surface including a guiding surface, a stopper surface, an end surface, and a valley, the groove defined in the guiding surface, the stopper surface and the end surface, and extending to the valley;
   a cam mounted on the shaft and adjacent to the follower, one end of the cam having a second cam surface forming a protrusion, the second cam surface engaging with the first cam surface; and
   a resilient member;
   wherein the resilient member is positioned such that the cam surface of the follower is forced against the cam surface of the cam due to a force of the resilient member, and when the follower is rotated about 180 degrees relative to the cam, the follower rotates further relative to the cam due to the protrusion rotating in the groove beyond 180 degrees.

7. The foldable electronic device of claim 6, wherein the follower defines a hole, the groove communicates with an inner portion of the first cam surface and the hole.

8. The foldable electronic device of claim 6, wherein the second cam surface includes a stopper surface, the protrusion extends from the stopper surface.

9. The foldable electronic device of claim 8, wherein the protrusion is substantially an arcuate wall.

10. A hinge assembly for interconnecting a cover and a main body of a foldable electronic device, comprising:
   a shaft;
   a cam mounted on the shaft, one end of the cam having a cam portion, the cam portion forming a protrusion;
   a follower mounted on the shaft and adjacent to the cam, one end of the follower having a latching cam portion, the latching cam portion engaging with the cam portion, the latching cam portion defining a groove, the groove receiving the protrusion; and
   a resilient member;
   wherein when the follower rotates about 180 degrees relative to the cam, the protrusion of the cam causes the cam to rotate beyond 180 degrees relative to the follower.

11. The hinge assembly of claim 10, wherein the latching cam portion includes a guiding surface, a stopper surface, an end surface, and a valley, the groove is defined in the guiding surface, the stopper surface and the end surface and extends to the valley.

12. The hinge assembly of claim 11, wherein the cam portion includes a stopper surface, the protrusion extends from the stopper surface.

13. The hinge assembly of claim 12, wherein the protrusion is substantially an arcuate wall.

* * * * *